United States Patent
Zhang et al.

(10) Patent No.: US 10,805,031 B2
(45) Date of Patent: Oct. 13, 2020

(54) METHOD FOR CONSTRUCTING ORTHOGONAL SEQUENCE SETS IN CDMA SYSTEM, CODE WORD GENERATING DEVICE, COMMUNICATION BASE STATION, BASE STATION CONTROLLER, AND WIRELESS COMMUNICATION NETWORK

(71) Applicant: Xi'an Creation Keji CO., Ltd., Xi'an (CN)

(72) Inventors: Weiguo Zhang, Xi'an (CN); Yu Zuo, Xi'an (CN)

(73) Assignee: XI'AN CREATION KEJI CO., LTD., Xi'An (CN)

( * ) Notice: Subject to any disclaimer, the term of this patent is extended or adjusted under 35 U.S.C. 154(b) by 77 days.

(21) Appl. No.: 16/234,518

(22) Filed: Dec. 27, 2018

(65) Prior Publication Data

US 2019/0207698 A1 Jul. 4, 2019

Related U.S. Application Data

(63) Continuation of application No. PCT/CN2018/113801, filed on Nov. 2, 2018.

(30) Foreign Application Priority Data

Dec. 27, 2017 (CN) .......................... 2017 1 1448147
Dec. 27, 2017 (CN) .......................... 2017 1 1448179

(51) Int. Cl.
| | |
|---|---|
| *H04J 13/12* | (2011.01) |
| *H04J 11/00* | (2006.01) |
| *H04J 13/18* | (2011.01) |
| *H04J 13/00* | (2011.01) |

(52) U.S. Cl.
CPC ............ *H04J 13/12* (2013.01); *H04J 11/005* (2013.01); *H04J 13/0048* (2013.01); *H04J 13/18* (2013.01)

(58) Field of Classification Search
CPC . H04J 11/00; H04J 13/00; H04J 13/18; H04L 5/0055; H04L 27/2607; H04L 1/1607; H04L 1/1861
See application file for complete search history.

(56) References Cited

U.S. PATENT DOCUMENTS

2011/0286436 A1* 11/2011 Suzuki .................. H04L 5/0048
370/336

* cited by examiner

*Primary Examiner* — Anez C Ebrahim
(74) *Attorney, Agent, or Firm* — Hemisphere Law, PLLC; Zhigang Ma

(57) ABSTRACT

The present invention relates to a method for constructing orthogonal sequence sets in a CDMA system, including: step a: selecting natural numbers m and k, m and k satisfying m=2k+4: step b: constructing a 5-spectral value vector Boolean function; step c: constructing 24 orthogonal sequence sets by using the 5-spectral value vector Boolean function; and step d: allocating the orthogonal sequence sets to cells, and causing that sequences in each of the cells are orthogonal with one another, and sequences in each of the cells and sequences in neighboring one of the cells are orthogonal with one another. The constructing method provided by the present invention can increase the number of users in cells, reduce the signal interferences of neighboring cells, and improves the communication quality consequently.

10 Claims, 3 Drawing Sheets

METHOD FOR CONSTRUCTING ORTHOGONAL SEQUENCE SETS IN CDMA SYSTEM, CODE WORD GENERATING DEVICE, COMMUNICATION BASE STATION, BASE STATION CONTROLLER, AND WIRELESS COMMUNICATION NETWORK

BACKGROUND OF THE INVENTION

1. Field of the Invention

The present invention relates to the field of wireless communication technologies, and in particular to a method for constructing orthogonal sequence sets in a CDMA system, a code word generating device, a communication base station, a base station controller, and a wireless communication network.

2. Description of Related Art

CDMA (Code Division Multiple Access), i.e., code division multiple access mobile communication is an epoch-making wireless communication technology. The principle the CDMA technology is based on a frequency spreading technology, that is, the to-be-transmitted information data with a certain signal bandwidth is modulated by a high-speed pseudo-random code of which the bandwidth is much larger than the signal bandwidth, so that the original data signal is expanded in bandwidth, and is then modulated by carriers and sent out. A receiving end uses the totally identical pseudo-random code to perform correlation processing with the received bandwidth signal, and the broadband signal is converted into a narrowband signal of the original information data, i.e., despreaded, to realize information communication.

The CDMA system is a communication system based on the code division technology. The system allocates a specific code word sequence to each user. The code word sequences have good orthogonality. These code word sequences with good orthogonality are used to code the information carried by the users. In this way, the information carried by different users be distinguished. The orthogonality of the code words in the CDMA system directly affects the anti-interference ability of the CDMA system.

At present, the user capacity of the CDMA system is obviously constrained by the orthogonal code words. Specifically, the number the orthogonal sequences generated by the prior art difficultly satisfies the increase trend of the number of users. As a result, the number of the users in cells is limited, the capacity of the CDMA system is constrained, and the development, of the CMDA system is restricted.

SUMMARY OF THE INVENTION

Therefore, in order to solve the defects and deficiencies of the prior art, the present invention provides a method for constructing orthogonal sequence sets in a CDMA system.

A method for constructing orthogonal sequence sets in a CDMA system, includes step a: selecting natural numbers m and k, m and k satisfying $m=2k+4$; step b: constructing a 5-spectral value vector Boolean function; step e: constructing 24 orthogonal sequence sets by using the 5-spectral value vector Boolean function; and step d: allocating the orthogonal sequence sets to cells, and causing that sequences in each of the cells are orthogonal with one another, and sequences in each of the cells and sequences in neighboring one of the cells are orthogonal with one another.

On the basis of the above embodiment, walsh spectral values, of the 5-spectral value vector Boolean function are $\{0, 2^{m/2}, -2^{m/2}, 2^{(m/2)+1}, -2^{(m/2)+1}\}$, and a length of a 5-spectral value sequence corresponding to the 5-spectral value vector Boolean function is On the basis of the above embodiment, the step b of constructing a 5-spectral value vector Boolean function comprises: $F_2^k$ is a k-dimensional vector space, $F_{2^k}$ is a finite field with a feature of 2, and $(b_1, b_2, \ldots, b_k) \in F_2^k$: $\gamma$ is set to be a primitive element of $F_{2^k}$, and $\{1, \gamma, \ldots, \gamma^{k-1}\}$ is a group of bases of $F_{2^k}$, isomorphic $\pi: F_{2^k} \mapsto F_2^k$ is defined as that $\pi(b_1 + b_2\gamma + \ldots + b_k\gamma^{k-1}) = (b_1, b_2, \ldots, b_k)$; for $i=0,1$, $\phi_i: F_2^k \to F_2^k$ is set to be a permutation and is defined as:

$$\phi_i(y) = \begin{cases} 0_k, & y = 0_k \\ \pi(\gamma^{[y]-i}), & y \in F_2^{k*} \end{cases},$$

[y] is a decimal representation of y: $\psi_0$ and $\psi_1$ are set to be two permutations of $F_k^2$, and: $\psi_1(00)=00$, $\psi_1(01)=10$, $\psi_1(10)=0,1$, $\psi_1(11)=11$, $\psi_2(00)=00$, $\psi_2(01)=01$, $\psi_2(10)=11$, $\psi_2(11)=10$, $X=(x_1, x_2, \ldots, x_m) \in F_2^m$, $X_0=(x_3, \ldots, x_{k+1}) \in F_2^k$, $X_1=(x_{k+3}, \ldots, x_{m-2}) \in F_2^k$, $X'_0=(x_2, \ldots, x_{k+1}) \in F_2^k$, and $X'_1=(x_{k+2}, \ldots, x_{m-3}) \in F_2^k$ are set; then a method for constructing the 5-spectral value vector Boolean function F $F: F_2^m \to F_2^2$ is as follows: $F(X)=(f_0(X), f_1(X))$, $i=0, 1$, $$f_i(X) = \begin{cases} \phi_i(X_0) \cdot X_1 + \psi_i(x_1, x_2) \cdot (x_{m-1}, x_m), & \text{if } (x_1, x_2) \in \{10, 11\}, X_1 \in F_2^k \\ \phi_i(X'_0) \cdot X'_1, & \text{if } x_1 = 0, X'_1 \in F_2^k \end{cases}.$$

On the basis of the above embodiment, the step c of constructing 24 orthogonal sequence sets by using the 5-spectral value vector Boolean function includes: dividing a $2^m \times 2^m$ dimensional Hadamard matrix into six orthogonal sequence sets according to a preset rule, wherein any one of two of the six orthogonal sequence sets contains $2^{m-2}$ sequences, and any one of remaining four of the six orthogonal sequence sets contains $2^{m-3}$ sequences: obtaining four 5-spectral value Boolean functions according to the 5-spectral value vector Boolean function; converting truth tables of the four 5-spectral value Boolean functions into 1 or −1, to thereby form four 5-spectral value sequence sets; and multiplying each of the six orthogonal sequence sets by the four 5-spectral value sequence sets individually to obtain the 24 orthogonal sequence sets.

On the basis of the above embodiment, the step of converting truth tables of the four 5-spectral value Boolean functions into 1 or −1 includes: recording a value of the 5-spectral value Boolean function as 1 in the truth table, if the value of the 5-spectral value Boolean function is 0; and recording a value of the 5-spectral value Boolean function as −1 in the truth table, if the value of the 5-spectral value Boolean function is 1.

On the basis of the above embodiment, after the step d of allocating the orthogonal sequence sets to cells, and causing that sequences within each of the cells are orthogonal with one another, and sequences in each of the cells and sequences in neighboring one of the cells are orthogonal with another, the method further includes: minimizing a correlation value mutually spaced ones the cells, so as to reduce interference of the CDMA system.

A code word generating device is applied to a CDMA wireless communication system and includes: a sequence generating unit, configured to generate orthogonal sequence sets; a storage unit, electrically connected to the sequence generating unit, and configured to store the orthogonal sequence sets; a reading unit, electrically connected to the storage unit, and configured to read the orthogonal sequence sets subjected to a control signal; and a transceiving unit, electrically connected to the reading unit, and configured to receive and transmit user information coded by using the orthogonal sequence sets.

In an embodiment, the sequence generating unit includes: a selecting subunit, configured to select natural numbers m and k, m and k satisfying m=2k+4; a first constructing subunit, connected to the selecting subunit, and configured to construct a 5-spectral value vector Boolean Function; a second constructing subunit, connected to the first constructing subunit, and configured to construct 24 orthogonal sequence sets by using the 5-spectral value vector Boolean function; and an allocating subunit, connected to the second constructing subunit, and configured to allocate the orthogonal sequence sets to cells according to a preset rule, and cause that sequences in each of the cells are orthogonal with one another, and sequences in each of the cells and sequences in neighboring one of the cells are orthogonal with one another.

In an embodiment, walsh spectral values of the 5-spectral value vector Boolean function as $\{0, 2^{m/2}, -2^{m/2}, 2^{(m/2)+1}, -2^{(m/2)+1}\}$, and a length of a 5-spectral value sequence corresponding to the 5-spectral value vector Boolean function is $2^m$.

In an embodiment, the first constructing subunit is specifically configured for that: $F_2^k$ is a k-dimensional vector space, $F_{2^k}$ is a finite field with a feature of 2, and $(h_1, h_2, \ldots, b_k) \in F_2^k$: $\gamma$ is set to be a primitive element of $F_{2^k}$, and $\{1, \gamma, \ldots, \gamma^{k-1}\}$ is a group of bases of $F_{2^k}$, isomorphic $\pi: F_{2^k} \mapsto F_2^k$ is defined as that $\pi(b_1+b_2\gamma+\ldots+b_k\gamma^{k-1}) = (b_1, b_2, \ldots, b_k)$, for i=0, 1, $\phi_1: F_2^k \to F_2^k$ is set to be a permutation and is defined as:

$$\phi_i(y) = \begin{cases} 0_k, & y = 0_k \\ \pi(\gamma^{[y]+i}), & y \in F_2^{k*} \end{cases},$$

wherein [y] is a decimal representation of y; $\psi_0$ and $\psi_1$ are set to be two permutations of $F_2^2$, and
$\psi_1(00)=00$, $\psi_1(01)=10$, $\psi_1(10)=01$, $\psi_1(11)=11$, $\psi_2(00)=00$, $\psi_2(01)=01$, $\psi_2(10)=11$, $\psi_2(11)=10$, $X=(x_1, x_2, \ldots, x_m) \in F_2^m$, $X_0=(x_3, \ldots, x_{k+2}) \in F_2^k$, $X_1=(x_{k+3}, \ldots, x_{m+2}) \in F_2^k$, $X'_0=(x_2, \ldots, x_{k+1}) \in F_2^k$, and $X'_1=(x_{k+1}, \ldots, x_{m-3}) \in F_2^k$ are set; then a method for constructing the 5-spectral value Boolean function F $F: F_2^m \mapsto F_2^2$ is as follows:

$$F(X) = (f_0(X), f_1(X)),$$

$$i = 0, 1,$$

$$f_i(X) = \begin{cases} \phi_i(X_0) \cdot X_1 + \psi_i(x_1, x_2) \cdot (x_{m-1}, x_m), & \text{if } (x_1, x_2) \in \{10, 11\}, X_1 \in F_2^k \\ \phi_i(X'_0) \cdot X'_1, & \text{if } x_1 = 0, X'_1 \in F_2^k \end{cases}$$

In an embodiment, the second constructing subunit includes: a dividing module, configured to divide a $2^m \times 2^m$ dimensional Hadamard matrix into six orthogonal sequence sets according to a preset rule, wherein any one of two of the six orthogonal sequence sets contains $2^{m-2}$ sequences, and any one of remaining four of the six orthogonal sequence sets contains $2^{m-3}$ sequences; an obtaining module, connected to the dividing module, and configured to obtain four 5-spectral value Boolean functions according to the 5-spectral value vector Boolean function; a converting module, connected to the dividing module, and configured to convert truth tables of the four 5-spectral value Boolean functions into 1 or −1, to form four 5-spectra value sequence sets; and a multiplying module, connected to the converting module, and configured to multiply each of the six orthogonal sequence sets by the four 5-spectral value sequence sets individually to obtain the 24 orthogonal sequence sets.

The present invention further provides a communication base station including the code word generating device according to any one of the above embodiments.

The present invention still further provides a base station controller including the code word generating device according to any one of the above embodiments.

The present invention even still further provides a wireless communication network including the communication base station or the base station controller.

The constructing method provided by the present invention can increase the number of users in cells, reduce the signal interference of neighboring cells, and improves the communication quality consequently.

BRIEF DESCRIPTION OF THE DRAWINGS

The specific embodiments of the present invention will be illustrated in detail in combination with the drawings.

DETAILED DESCRIPTION OF THE PREFERRED EMBODIMENTS

Figure 1:
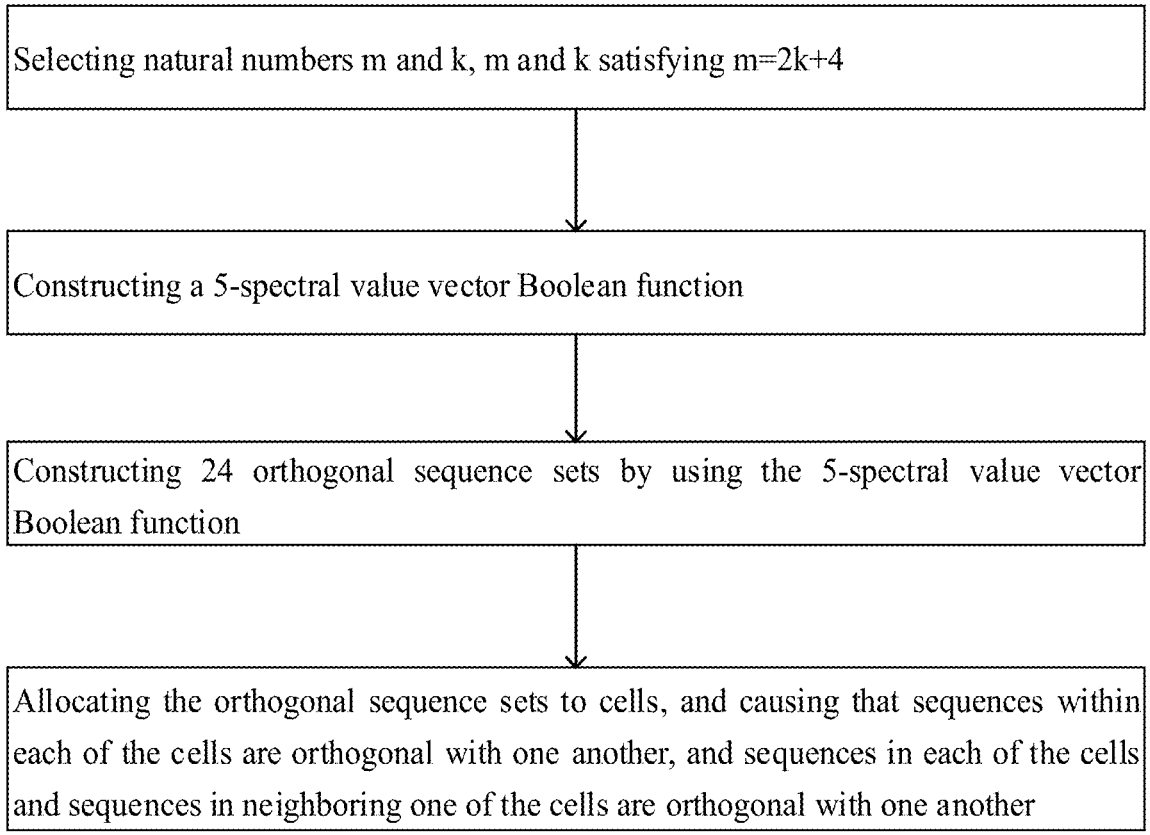
FIG. 1 is a flowchart of a method for constructing orthogonal sequence sets in a CDMA system according to an embodiment of the present invention.

In the following, with reference to accompanying drawings of embodiments of the invention, technical solutions in the embodiments of the invention will be dearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Embodiment 1

In order to better illustrate the method provided by the present invention, the technical background of the present invention will be firstly described as follows.

At first some concepts and tools related to a Boolean function and the sequence will be introduced. The main tool is walsh transformation.

$F_2^m$ is set to an m-dimensional vector space, $F_{2^m}$ is a finite field on GF(2), wherein GF(2) is the finite field in modern algebra, then the m-elementary Boolean function $f(x)$ is represented as a mapping of some $F_2^m$ to $F_2$. Herein, $x=(x_1, \ldots, x_m) \in F_2^m$. $B_m$ is set to represent a set of all m-elementary Boolean functions. For convenience, the addition operation in $F_2^m$ and $F_{2^n}$ is replaced with "+" and $\Sigma_i$. Any Boolean function $f \in B_m$ can be represented by its algebraic regular type:

$$f(x_1, \ldots, x_m) = \sum_{b \in F_2^m} \lambda_b \left( \prod_{i=1}^{m} x_i^{b_i} \right),$$

wherein $\lambda_b \in F_2$, $b=(b_1, \ldots, b_m) \in F_2^m$. The algebra degree of $f(x)$ is the minimum value of wt(b) enabling $\lambda_b \neq 0$, and is recorded as deg(f), wherein wt(b) is the Hamming weight of b. When deg($f$)=1, $f$ is called an affine function.

For $a=(a_1, \ldots, a_m) \in F_2^m$, $b=(b_1, \ldots b_m) \in F_2^m$. Then the inner product of a and b is defined as:

$$a \cdot b = \sum_{i=1}^{m} a_i b_i,$$

wherein the addition is mod 2 operation.

Any linear function on $F_2^m$ can be defined by an inner product $\omega \cdot x$, wherein $\omega=(\omega_1, \ldots, \omega_m)$, $x=(x_1, \ldots, x_m) \in F_2^m$. Each $\omega$ distinguishes different linear functions. A set containing all m-elementary linear functions is defined as $L_m$, thus $L_m=\{\omega \cdot x | \omega \in F_2^m\}$.

$B_m$ is set to represent a set of all m-elementary Boolean functions. For any $f \in B_m$, the Walsh spectrum thereof is defined as follows:

$$W_f(\omega) = \sum_{x \in F_2^m} (-1)^{f(x)+\omega \cdot x}.$$

supp($f$)=$\{x \in F_2^m | f(x)=1\}$ is defined as a support set for the function $f$. If the numbers of 0 and 1 in the truth table of the m-elementary function $f \in B_m$ are equal, it is called the balance function, i.e., # supp($f$)=$2^{m-1}$ or: $W_f(0_m)=0$, wherein $0_m$ represents a m-long 0 vector.

The sequence of function $f \in B_m$ is $N=2^m$-long $(1, -1)$ sequence, and defined as $\bar{f}=((-1)^{f(0, \ldots, 0,0)}, (-1)^{f(0, \ldots, 0,1)}, \ldots, (-1)^{f(1, \ldots, 1,1)})$.

The inner product of vectors $\bar{f}_1=(u_1, \ldots, u_N)$ and $\bar{f}_2=(v_1, \ldots, v_N)$ is expressed as $\bar{f}_1 \cdot \bar{f}_2$, defined as:

$$\bar{f}_1 \cdot \bar{f}_2 = \sum_{i=1}^{N} u_i v_i.$$

Thus it can be seen that $W_f(\omega)=\bar{f} \cdot \bar{l}$, wherein $l=\omega \cdot x$.

A $2^m \times 2^m$ Hadamard matrix $H_m$ is defined as: $H_0=(1)$, $$H_m = \begin{pmatrix} H_{m-1} & H_{m-1} \\ H_{m-1} & -H_{m-1} \end{pmatrix},$$

$m=1, 2, \ldots$.

$r_j$, $0 \leq j \leq 2^m-1$ is set to the jth column of $H_m$, then $r_j$ is a linear sequence, and is often called the set $H=\{r_j | 0 \leq j \leq 2^m-1\}$, which is a Hadamard sequence set, and it is obvious that $H=\{\bar{l} | l \in L_m\}$.

Definition 1:

$f_1, f_2 \in B_m$ is set. If $\bar{f}_1 \cdot \bar{f}_2 = \sum_{x \in F_2^m} (-1)^{f_1(x)+f_2(x)} = 0$ satisfied $\bar{f}_1$ and $\bar{f}_2$ are orthogonal, which is expressed as $\bar{f}_1 \perp \bar{f}_2$.

$S=\{\bar{f}_i | f_i \in B_m, i=1, 2, \ldots, \kappa\}$ (11) is set.

If $\bar{f}_i$ of the set S are orthogonal pairwise, S is called the orthogonal sequence set with the base $\kappa$. $S_1$ and $S_2$ are set to orthogonal sequence sets, for any $\bar{f}_1 \in S$, $\bar{f}_2 \in S$, $\bar{f}_1 \cdot \bar{f}_2=0$ always, then, $S_1$ and $S_2$ are called to be orthogonal, which is expressed as $S_1 \perp S_2$.

The orthogonal sequence has the following important properties.

Lemma 1: $f_1, f_2 \in B_m$ is set. Then $\bar{f}_1 \perp \bar{f}_2$ is and only if $W_{f_1+f_2}(0_m)=0$.

For any two different linear functions $l, l' \in L_m$, $W_{l+l'}(0_m)=0$, then $\bar{l} \perp \bar{l}'$ is always true, that is, H is an orthogonal sequence set.

Definitions 2: if for any $\alpha \in F_2^m$, $W_f(\alpha) \in \{0, \pm 2^\lambda\}$, wherein $\lambda \geq m/2$ is a positive integer, then such function is called the Plateaued function. When $\lambda \geq \lfloor (m+2)/2 \rfloor$, the function is called the semi-bent function. If $f$ is a Plateaued function (semi-bent function), $\bar{f}$ is called a Plateaued sequence (semi-bent sequence).

Definition 3: for any positive integer, $m=s+t$, and a Maiorana-McFarland function is defined as: $f(y,x)=\phi(y) \cdot x \oplus g(y)$, $y \in F_2^s$, $x \in F_2^t$, wherein $\phi$ is random mapping of $F_2^s$ to $F_2^t$ and $g \in B_s$.

When $s \leq t$ and $\phi$ is a single set, then the Maiorana-McFarland type function is the Plateaued function. In particular, when $s=t$ and $\phi$ is bijective, then the Maiorana-McFarland type of the bent function is obtained.

Definition 4: an m variable-elementary t-dimensional vector function is a mapping function $F: F_2^m \mapsto F_2^t$, or it can also be a t-elementary Boolean function set $F(x)=(f_1, \ldots, f_t)$. If any non-zero linear combination of component functions $f_1, \ldots, f_t$ is a three-value Plateaued Boolean function of which the spectral value is derived from $\{0 \pm 2^\lambda\}$. F is called a vector Plateaued function. When $\lambda=\lfloor (m+2)/2 \rfloor$, F is called the vector semi-bent function. If any non-zero linear combination of component functions $f_1, \ldots, f_t$ is a binary bent function of which the spectral value is derived from $\{\pm 2^{m/2}\}$, then F is called a vector bent function, wherein m is an even number and $t \leq m/2$.

Embodiment 2

Referring to FIG. 1, FIG. 1 is a flowchart of a method for constructing orthogonal sequence sets in a CDMA system according to an embodiment of the present invention. The method includes the following steps: step a: selecting natural numbers m and k, m and k satisfying m=2k+4: step b: constructing a 5-spectral value vector Boolean function; step c: constructing 24 orthogonal sequence sets by using the 5-spectral value vector Boolean function; and step d: allocating the orthogonal sequence sets to cells, and causing that sequences in each of the cells are orthogonal with one another, and sequences in each of the cells and sequences in neighboring one of the cells are orthogonal with one another.

Further, based on the above embodiment, walsh spectral values of the 5-spectral value vector Boolean function are $\{0, 2^{m/2}, -2^{m/2}, 2^{(m/2)+1}, -2^{(m/2)+1}\}$, and the length of a 5-spectral value sequence corresponding to the 5-spectral value vector Boolean function is $2^m$.

In one embodiment of the present invention, the manner of constructing the 5-spectral value vector Boolean is as follows.

$F_2^k$ is a k-dimensional vector space, $F_{2_k}$ is a finite field with a feature of 2, wherein GF(2) is the finite field in modern algebra, and $(b_1, b_2, \ldots b_k) \in F_2^k$: $\gamma$ is set to be a primitive element of $F_{2_k}$, and $\{1, \gamma, \ldots, \gamma^{k-1}\}$ is a group of bases of $F_{2_k}$, isomorphic $\pi: F_{2_k} \mapsto F_2^k$ is defined as that $\pi(b_1+b_2\gamma+ \ldots +b_k\gamma^{k-1})=(b_1, b_2, \ldots, b_k)$, for i=0, 1, $\phi_1: F_2^k \to F_2^k$ is set to be a permutation and is defined as:

$$\phi_i(y) = \begin{cases} 0_k, & y = 0_k \\ \pi(\gamma^{[y]+i}), & y \in F_2^{k*} \end{cases},$$

wherein [y] is the decimal representation of y: $\psi_0$ and $\psi_1$ are set to be two permutations on $F_2^2$, and: $\psi_1(00)=00$, $\psi_1(01)=10$, $\psi_1(10)=01$, $\psi_1(11)=11$, $\psi_2(00)=00$, $\psi_2(01)=01$, $\psi_2(10)=11$, $\psi_2(11)=10$, $X=(x_1, x_2, \ldots, x_m) \in F_2^m$, $X_0=(x_3, \ldots, x_{k+2}) \in F_2^k$, $X_1=(x_{k+3}, \ldots, x_{m-2}) \in F_2^k$, $X'_0=(x_2, \ldots, x_{k+1}) \in F_2^k$, and $X'_1=(x_{k+2}, \ldots, x_{m-3}) \in F_2^k$ are set; then the method for constructing the 5-spectral value vector Boolean function F $F: F_2^m \mapsto F_2^2$ is as follows: $F(X)=(f_0(X), f_1(X))$, t=0, 1, $f_i(X) =$
$\begin{cases} \phi_i(X_0) \cdot X_1 + \psi_i(x_1, x_2) \cdot (x_{m-1}, x_m), & \text{if } (x_1, x_2) \in \{10, 11\}, \ X_1 \in F_2^k \\ \phi_i(X'_0) \cdot X'_1, & \text{if } x_1 = 0, \ X'_1 \in F_2^k \end{cases}.$ Further, based on the above embodiment, constructing 24 orthogonal sequence sets by using the 5-spectral value vector Boolean function specifically includes: dividing a $2^m \times 2^m$ dimensional Hadamard matrix into six orthogonal sequence sets according to a set rule, wherein any one of two of the six orthogonal sequence sets contains $2^{m-2}$ sequences, and any one of the remaining four of the six orthogonal sequence sets contains $2^{m-3}$ sequences: obtaining four 5-spectral value Boolean functions according to the 5-spectral value vector Boolean functions: converting truth tables of the four 5-spectral value Boolean functions into 1 or -1 to form four 5-spectral value sequence sets, wherein converting truth tables of the four 5-spectral value Boolean function into 1 or -1 specifically includes: if the value of the 5-spectral value Boolean function is 0, then recording the value of the 5-spectral value Boolean function as 1 in the truth table, and if the value of the 5-spectral value Boolean function as 1, then recording the value of the 5-spectral value Boolean function as -1 in the truth table; and multiplying each of the six orthogonal sequence sets by the four 5-spectral value sequence sets individually to obtain 24 orthogonal sequence sets.

Specifically, in one embodiment, for $c \in F_2^2$, $f_c = c \cdot F$ is set, and $H_\alpha^{f_c} = \{\overline{f_c} | l = (\beta, \alpha) \cdot X, \beta \in F_2^{m-3}\}$.

$H_{10}^{f_c} = H_{010}^{f_c} \cup H_{110}^{f_c}$ and $H_{01}^{f_c} \angle H_{101}^{f_c}$ are set.

24 different sequence sets can be obtained, wherein for $c \in F_2^2$, $|H_{10}^{f_c}|=|H_{01}^{f_c}|=2^{m-2}$ and $|H_\alpha^{f_c}|=2^{m-3}$ when $\alpha \in \{000, 100, 011, 111\}$.

Embodiment 3

The present embodiment further explains the effect of the generating manner for the orthogonal sequence sets provided in embodiment 2.

The sequence set is set to be obtained by $H_\alpha^{f_c} = \{\overline{f_c+l} | l = (\beta, \alpha) \cdot X, \beta \in F_2^{m-3}\}$, then there are the following conclusions.

1. For any $c \in F_2^2$, $H_\alpha^{f_c}$ is an orthogonal sequence set, and for any $\alpha \neq \alpha'$, $H_\alpha^{f_c} \perp H_{\alpha'}^{f_c}$.

2. $S \in H_\alpha^{f_c}$ and $s' \in H_{\alpha'}^{f_d}$ are set, wherein $c \neq c^1$, then:

$$s \cdot s' = \begin{cases} \pm 2^{m/2+1}, & \text{if } \alpha = \alpha' \\ 0, & \text{if } \alpha + \alpha' \in \{(0, c+c'), (1, c+c'), 100\} \\ \pm 2^{m/2}, & \text{otherwise} \end{cases}$$

The reasons for the above conclusions are explained below.

For any $\alpha \neq \alpha'$, $H_\alpha \perp H_{\alpha'}$, $H_\alpha^f$ is an orthogonal set, and the number of dimension is $2^{m-3}$ for any $\alpha \in F_2^3$.

For $s \in H_\alpha^{f_c}$, $s' \in H_{\alpha'}^{f_{c'}}$, the cross-correlation thereof is calculated by the formula $$\sum_{X \in F_2^m} (-1)^{f_c(X) + f_{c'}(X) + (\beta, \alpha) \cdot X + (\beta', \alpha') \cdot X} = \sum_{X \in F_2^m} (-1)^{f_c + f_{c'}(X) + (\beta + \beta', \alpha + \alpha') \cdot X}.$$

S1 is et to be equal to $$\sum_{x_1 = 0} (-1)^{\phi_{c+c'}(X'_0) \cdot X'_1 + (\beta + \beta', \alpha + \alpha') \cdot X}.$$

S2 is set to be equal to $$\sum_{x_1 = 1, x_2 = 0} (-1)^{\phi_{c+c'}(X_0) \cdot X_1 + \varphi_{c+c'}(x_1, x_2) \cdot (x_{m-1}, x_m) + (\beta + \beta', \alpha + \alpha') \cdot X}.$$

S3 is set to be equal to $$\sum_{x_1 = 1, x_2 = 1} (-1)^{\phi_{c+c'}(X_0) \cdot X_1 + \varphi_{c+c'}(x_1, x_2) \cdot (x_{m-1}, x_m) + (\beta + \beta', \alpha + \alpha') \cdot X}.$$

When $\alpha = \alpha'$, $s1 = \pm s^{k+3} = \pm 2^{m/s+1}$, and s2+S3=0.
When $\alpha + \alpha' = 100$, s1=0, and s2+s3=0.
When $\alpha + \alpha' \in (0, c+c')$, $(1, c-c')$, s1=0, and s2+s3=0.
When $\alpha, \alpha'$ are in other cases, the first cumulative equation is zero, and the cumulative sum of one of the second and third cumulative equations is 0, and the cumulative sum of the other is 0, so that the cross-correlation values in the remaining cases are all $\pm 2^{m/2}$.

Embodiment 4

The present embodiment describes a method for allocating the generated orthogonal sequences to a plurality of cells based on the above embodiments.

Referring to Table 1, Table 1 is a cross-correlation value comparison table of any two sequence sets obtained according to the embodiment of the present invention.

TABLE 1

| Cross-correlation values of orthogonal sequence sets | | | | | | | | |
|---|---|---|---|---|---|---|---|---|
|  | $H_{000}$ | $H_{100}$ | $H_{001}$ | $H_{101}$ | $H_{010}$ | $H_{110}$ | $H_{011}$ | $H_{111}$ |
| $H_{000}{}^{f10}$ | $\pm 2^{m/2+1}$ | 0 | $\pm 2^{m/2}$ | $\pm 2^{m/2}$ | 0 | 0 | $\pm 2^{m/2}$ | $\pm 2^{m/2}$ |
| $H_{100}{}^{f10}$ | 0 | $\pm 2^{m/2+1}$ | $\pm 2^{m/2}$ | $\pm 2^{m/2}$ | 0 | 0 | $\pm 2^{m/2}$ | $\pm 2^{m/2}$ |
| $H_{001}{}^{f10}$ | $\pm 2^{m/2}$ | $\pm 2^{m/2}$ | $\pm 2^{m/2+1}$ | 0 | $\pm 2^{m/2}$ | $\pm 2^{m/2}$ | 0 | 0 |
| $H_{101}{}^{f10}$ | $\pm 2^{m/2}$ | $\pm 2^{m/2}$ | 0 | $\pm 2^{m/2+1}$ | $\pm 2^{m/2}$ | $\pm 2^{m/2}$ | 0 | 0 |
| $H_{010}{}^{f10}$ | 0 | 0 | $\pm 2^{m/2}$ | $\pm 2^{m/2}$ | $\pm 2^{m/2+1}$ | 0 | $\pm 2^{m/2}$ | $\pm 2^{m/2}$ |
| $H_{110}{}^{f10}$ | 0 | 0 | $\pm 2^{m/2}$ | $\pm 2^{m/2}$ | 0 | $\pm 2^{m/2+1}$ | $\pm 2^{m/2}$ | $\pm 2^{m/2}$ |
| $H_{011}{}^{f10}$ | $\pm 2^{m/2}$ | $\pm 2^{m/2}$ | 0 | 0 | $\pm 2^{m/2}$ | $\pm 2^{m/2}$ | $\pm 2^{m/2+1}$ | 0 |
| $H_{111}{}^{f10}$ | $\pm 2^{m/2}$ | $\pm 2^{m/2}$ | 0 | 0 | $\pm 2^{m/2}$ | $\pm 2^{m/2}$ | 0 | $\pm 2^{m/2+1}$ |
| $H_{000}{}^{f01}$ | $\pm 2^{m/2+1}$ | 0 | 0 | 0 | $\pm 2^{m/2}$ | $\pm 2^{m/2}$ | $\pm 2^{m/2}$ | $\pm 2^{m/2}$ |
| $H_{100}{}^{f01}$ | 0 | $\pm 2^{m/2+1}$ | 0 | 0 | $\pm 2^{m/2}$ | $\pm 2^{m/2}$ | $\pm 2^{m/2}$ | $\pm 2^{m/2}$ |
| $H_{001}{}^{f01}$ | 0 | 0 | 0 | $\pm 2^{m/2+1}$ | $\pm 2^{m/2}$ | $\pm 2^{m/2}$ | $\pm 2^{m/2}$ | $\pm 2^{m/2}$ |
| $H_{101}{}^{f01}$ | 0 | 0 | $\pm 2^{m/2+1}$ | 0 | $\pm 2^{m/2}$ | $\pm 2^{m/2}$ | $\pm 2^{m/2}$ | $\pm 2^{m/2}$ |
| $H_{010}{}^{f01}$ | $\pm 2^{m/2}$ | $\pm 2^{m/2}$ | $\pm 2^{m/2}$ | $\pm 2^{m/2}$ | 0 | $\pm 2^{m/2+1}$ | 0 | 0 |
| $H_{110}{}^{f01}$ | $\pm 2^{m/2}$ | $\pm 2^{m/2}$ | $\pm 2^{m/2}$ | $\pm 2^{m/2}$ | $\pm 2^{m/2+1}$ | 0 | 0 | 0 |
| $H_{011}{}^{f01}$ | $\pm 2^{m/2}$ | $\pm 2^{m/2}$ | $\pm 2^{m/2}$ | $\pm 2^{m/2}$ | 0 | 0 | $\pm 2^{m/2+1}$ | 0 |
| $H_{111}{}^{f01}$ | $\pm 2^{m/2}$ | $\pm 2^{m/2}$ | $\pm 2^{m/2}$ | $\pm 2^{m/2}$ | 0 | 0 | 0 | $\pm 2^{m/2+1}$ |
| $H_{000}{}^{f11}$ | $\pm 2^{m/2+1}$ | 0 | 0 | 0 | $\pm 2^{m/2}$ | $\pm 2^{m/2}$ | 0 | 0 |
| $H_{100}{}^{f11}$ | 0 | $\pm 2^{m/2+1}$ | $\pm 2^{m/2}$ | $\pm 2^{m/2}$ | $\pm 2^{m/2}$ | $\pm 2^{m/2}$ | 0 | 0 |
| $H_{001}{}^{f11}$ | $\pm 2^{m/2}$ | $\pm 2^{m/2}$ | 0 | $\pm 2^{m/2+1}$ | 0 | 0 | $\pm 2^{m/2}$ | $\pm 2^{m/2}$ |
| $H_{101}{}^{f11}$ | $\pm 2^{m/2}$ | $\pm 2^{m/2}$ | $\pm 2^{m/2+1}$ | 0 | 0 | 0 | $\pm 2^{m/2}$ | $\pm 2^{m/2}$ |
| $H_{010}{}^{f11}$ | $\pm 2^{m/2}$ | $\pm 2^{m/2}$ | 0 | 0 | 0 | $\pm 2^{m/2+1}$ | $\pm 2^{m/2}$ | $\pm 2^{m/2}$ |
| $H_{110}{}^{f11}$ | $\pm 2^{m/2}$ | $\pm 2^{m/2}$ | 0 | 0 | $\pm 2^{m/2+1}$ | 0 | $\pm 2^{m/2}$ | $\pm 2^{m/2}$ |
| $H_{011}{}^{f11}$ | 0 | 0 | $\pm 2^{m/2}$ | $\pm 2^{m/2}$ | $\pm 2^{m/2}$ | $\pm 2^{m/2}$ | $\pm 2^{m/2+1}$ | 0 |
| $H_{111}{}^{f11}$ | 0 | 0 | $\pm 2^{m/2}$ | $\pm 2^{m/2}$ | $\pm 2^{m/2}$ | $\pm 2^{m/2}$ | 0 | $\pm 2^{m/2+1}$ |

Further, after allocating the allocating the orthogonal sequence sets to cells, and causing that sequences in each of the cells are orthogonal with one another, and sequences in each of the cells and sequences in neighboring one of the cells are orthogonal with one another, the following step may be executed: minimizing a correlation value of mutually spaced ones of cells to reduce the interference of the CMDA system.

Figure 2:
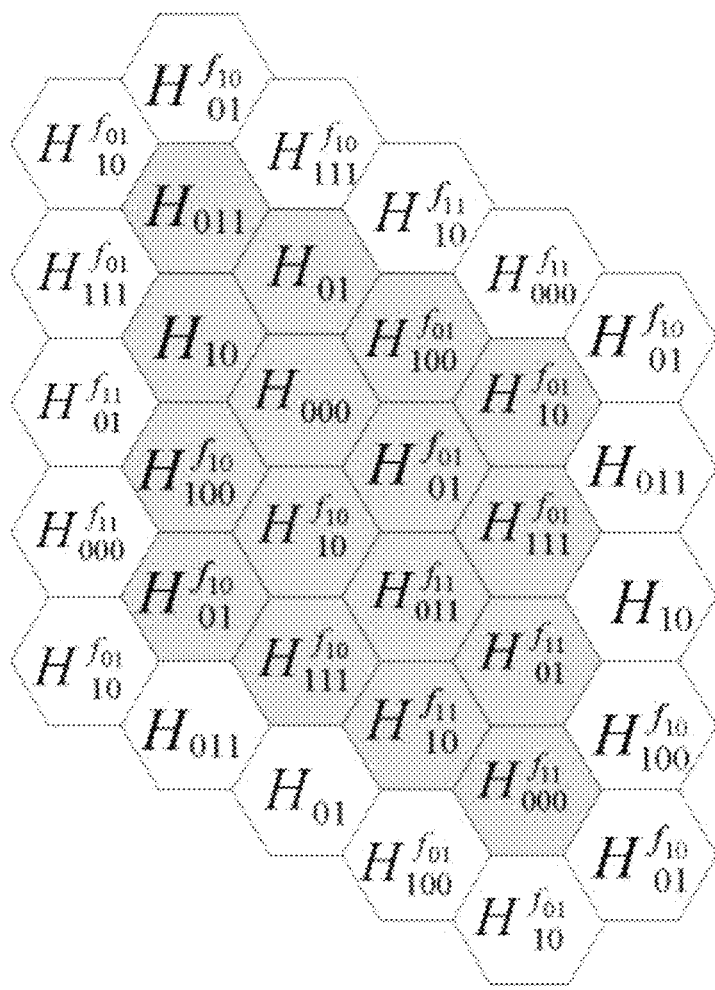
FIG. 2 is a schematic diagram of allocating sequence sets in a plurality of cells according to an embodiment of the present invention.

Referring to FIG. 2, FIG. 2 is a schematic diagram of allocating sequence sets in a plurality of cells according to an embodiment of the present invention. Specifically, the distance between two adjacent cells is set to 1, that is, the distance between the center points of two adjacent regular hexagons in FIG. 2 is 1, then the multiplexing distance of the CDMA system in FIG. 2 is D=4. Such arrangement ensures the orthogonality of the neighboring cells and effectively suppresses the interference from the neighboring cells. In FIG. 2, $H_o$ is an abbreviation for $H_\alpha{}^{f00}$.

Embodiment 5

Figure 3:
FIG. 3 is a schematic structural diagram of a code word generating device according to the present invention.

FIG. 3 is a schematic structural diagram of a code word generating device according to the present invention. The code word generating device is applied to a CDMA wireless communication system, and includes a sequence generating unit, configured to generate orthogonal sequence sets; a storage unit, electrically connected to the sequence generating unit, and configured to store the orthogonal sequence sets; a reading unit, electrically connected to the storage unit, and configured to read the orthogonal sequence sets under the action of a control signal; and a transceiving unit, electrically connected to the reading unit, and configured to receive and transmit user information coded by using the orthogonal sequence sets.

Figure 4:
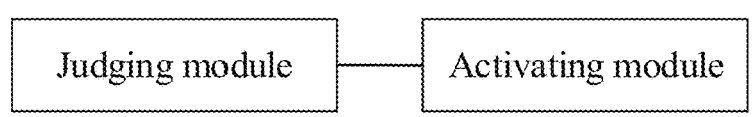
FIG. 4 is schematic structural diagram of a sequence generating unit according to the present invention.

Further, based on the above embodiment, referring to FIG. 4, FIG. 4 is a schematic structural diagram of a sequence generating unit according to the present invention.

The sequence generating unit includes: a selecting subunit, configured to select natural numbers m and k, m and k satisfying m=2k+4; a first constructing subunit, connected to the selecting subunit, and configured to construct a 5-spectral value vector Boolean function; a second constructing subunit, connected to the first constructing subunit, and configured to construct 24 orthogonal sequence sets by using the 5-spectral value vector Boolean function, and an allocating subunit, connected to the second constructing subunit, and configured to allocate the orthogonal sequence sets to cells according to a preset rule/algorithm, and cause that sequences in each of the cells are orthogonal with one another, and sequences in each of the cells and sequences in neighboring one of the cells are orthogonal with one another.

Further, walsh spectral values of the 5-spectral value vector Boolean function are $\{0, 2^{m/2}, -2^{m/2}, 2^{(m/2)+1}, -2^{(m/2)+1}\}$, and the length of a 5-spectral value sequence corresponding to the 5-spectral value Boolean function is $2^m$.

Further based on the above embodiment, the first constructing subunit is specifically configured for the $F_2{}^k$ is a k-dimensional vector space. $F_{2^k}$ is a finite field with a feature of 2, and $(b_1, b_2, \ldots, b_k) \in F_2{}^k$: $\gamma$ is set to be a primitive element of $F_{2^k}$, and $\{1, \gamma, \ldots, \gamma^{k-1}\}$ is a group of bases of $F_{2^k}$, isomorphic $\pi: F_{2^k} \mapsto F_2{}^k$ is defined as $\pi(b_1 + b_2\gamma + \ldots + b_k\gamma^{k-1}) = (b_1, b_2, \ldots b_k)$, for i=0, 1, $\phi_1: F_2{}^k \to F_2{}^k$ is set to be a permutation and is defined as $$\phi_i(y) = \begin{cases} 0_k, & y = 0_k \\ \pi(\gamma^{[y]+i}), & y \in F_2^{k^*} \end{cases},$$

wherein [y] is a decimal representation of y: $\psi_0$ and $\psi_1$ are set to be two permutations of $F_2^2$, and: $\psi_1(00)=00$, $\psi_1(01)=10$, $\psi_1(10)=01$, $\psi_1(11)=11$, $\psi'_2(00)=00$, $\psi_2(01)=01$, $\psi_2(10)=11$, $\psi_2(11)=10$, $X=(x_1, x_2, \ldots, x_m) \in F_2^m$. $X_0=(x_3, \ldots, x_{k+2}) \in F_2^k$. $X_1=(x_{k+3}, \ldots, x_{m+2}) \in F_2^k$. $X'_0=(x_2, \ldots, x_{k+1}) \in F_2^k$, and $X'_1=(x_{k+2}, \ldots, x_{m+3}) \in F_2^k$ are set; then the method for constructing the 5-spectral value vector Boolean function F $F: F_2^m \mapsto F_2^2$ is as follows: $F(X)=(f_0(X), f_1(X))$, i=0, 1, $$f_i(X) = \begin{cases} \phi_i(X_0) \cdot X_1 + \psi_i(x_1, x_2) \cdot (x_{m-1}, x_m), & \text{if } (x_1, x_2) \in \{10, 11\}, \quad X_1 \in F_2^k \\ \phi_i(X'_0) \cdot X'_1, & \text{if } x_1 = 0, X'_1 \in F_2^k \end{cases}.$$

Figure 5:
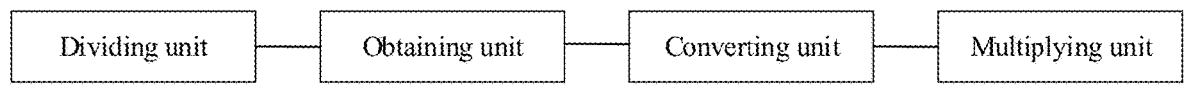
FIG. 5 is a schematic structural diagram of a second constructing subunit according to the present invention.

Further, based on the above embodiment, referring to FIG. 5, FIG. 5 is a schematic structural diagram of a second constructing subunit according to the present invention.

The second constructing subunit includes: a dividing module, configured to divide a $2^m \times 2^m$ dimensional Hadamard matrix into six orthogonal sequence sets according to a preset rule, wherein any one of two of the six orthogonal sequence sets contains $2^{m-2}$ sequences, and any one of the remaining four of the six orthogonal sequence sets contains $2^{m-3}$ sequences; an obtaining module, connected to the dividing module, and configured to obtain four 5-spectral value Boolean functions according to the 5-spectral value vector Boolean function; a converting module, connected to the dividing module, and configured to convert truth tables of the four 5-spectral value Boolean functions into 1 or −1 to form four 5-spectral value sequence sets; and a multiplying module, connected to the converting module, and configured to multiply each of the six orthogonal sequence sets by the four 5-spectral value sequence sets individually to obtain 24 orthogonal sequence sets.

The present invention further provides a communication base station, including the code word generating device according to any one of above embodiments.

The present invention further provides a base station controller, including the code word generating device according to any one of the above embodiments.

The present invention further provides a wireless communication network, including the communication base station according to any one of above embodiments or the base station controller according to any one of above embodiments.

The code word generating device, the communication base station, and the wireless communication network provided by the present invention can increase the number of users in the cells, reduce the signal interference of the neighboring cells, and improves the communication quality consequently.

Finally, the present invention provides a system for constructing orthogonal sequence sets in a CDMA system includes: a processor and a memory. The memory stores instructions executed by the processor, and the instructions cause the processor to perform operations to perform any one of the methods for constructing orthogonal sequence sets in a CDMA system as described above.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for constructing orthogonal sequence sets in a CDMA (code division multiple access) system, comprising:
   step a: selecting natural numbers in and k, in and k satisfying m=2k+4;
   step b: constructing a 5-spectral value vector Boolean function;
   step c: constructing 24 orthogonal sequence sets by using the 5-spectral value vector Boolean function; and
   step d: allocating the orthogonal sequence sets to cells, and causing that sequences within each of the cells are orthogonal with one another, and sequences in each of the cells and sequences in neighboring one of the cells are orthogonal with one another;
   wherein the method further comprises:
   using the orthogonal sequence sets allocated to the cells to code user information to obtain coded user information, and transmitting the coded user information for CDMA mobile communication.

2. The method according to claim 1, wherein walsh spectral values of the 5-spectral value vector Boolean function are $\{0, 2^{m/2}, -2^{m/2}, 2^{(m/2)+1}, -2^{(m/2)+1}\}$, and a length of a 5-spectral value sequence corresponding to the 5-spectral value vector Boolean function is $2^m$.

3. The method according to claim 2, wherein the step b of constructing a 5-spectral value vector Boolean function comprises:
   $F_2^k$ is a k-dimensional vector space, $F_{2^k}$ is a finite field with a feature of 2, and $(b_1, b_2, \ldots, b_k) \in F_2^k$:
   $\gamma$ is set to be a primitive element of $F_{2^k}$, and $\{1, \gamma, \ldots, \gamma^{k-1}\}$ is a group of bases of $F_{2^k}$, isomorphic $\pi: F_{2^k} \mapsto F_2^k$ is defined as that
   $\pi(b_1+b_2\gamma+\ldots+b_k\gamma^{k-1})=(b_1, b_2, \ldots, b_k)$,
   for i=0, 1, $\phi_i: F_2^k \to F_2^k$ is set to be a permutation and is defined as:

$$\phi_i(y) = \begin{cases} 0_k, & y = 0_k \\ \pi(\gamma^{[y]+i}), & y \in F_2^{k*} \end{cases},$$

wherein [y] is a decimal representation of y; $\psi_0$ and $\psi_1$ are set to be two permutations on $F_2^2$, and:
$\psi_1(00)=00$, $\psi_1(01)=10$, $\psi_1(10)=01$, $\psi_1(11)=11$,
$\psi_2(00)=00$, $\psi_2(01)=01$, $\psi_2(10)=11$, $\psi_2(11)=10$,
$X=(x_1, x_2, \ldots, x_m) \in F_2^m$, $X_0=(x_3, \ldots, x_{k+2}) \in F_2^k$,
$X_1=(x_{k+3}, \ldots, x_{m-2}) \in F_2^k$, $X'_0=(x_2, \ldots, x_{k+1}) \in F_2^k$, and
$X'_1=(x_{k+2}, \ldots, x_{m-3}) \in F_2^k$ are set; then a method for constructing the 5-spectral value vector Boolean function F $F: F_2^k \mapsto F_2^2$ is as follows:

$$F(X) = (f_0(X), f_1(X)), i = 0, 1,$$

$$f_i(X) = \begin{cases} \phi_i(X_0) \cdot X_1 + \psi_i(x_1, x_2) \cdot (x_{m-1}, x_m), & \text{if } (x_1, x_2) \in \{10, 11\}, \quad X_1 \in F_2^k \\ \phi_i(X'_0) \cdot X'_1, & \text{if } x_1 = 0, X'_1 \in F_2^k \end{cases}.$$

4. The method according to claim 3, wherein the step c of constructing 24 orthogonal sequence sets by using the 5-spectral value vector Boolean function comprises:

dividing a $2^m \times 2^m$ dimensional Hadamard matrix into six orthogonal sequence sets according to a preset rule, wherein any one of two of the six orthogonal sequence sets contains $2^{m-2}$ sequences, and any one of remaining four of the six orthogonal sequence sets contains $2^{m-3}$ sequences;

obtaining four 5-spectral value Boolean functions according to the 5-spectral value vector Boolean function;

converting truth tables of the four 5-spectral value Boolean functions into 1 or −1, to thereby form four 5-spectral value sequence sets; and multiplying each of the six orthogonal sequence sets by the four 5-spectral value sequence sets individually to obtain the 24 orthogonal sequence sets.

5. The method according to claim 4, wherein the step of converting truth tables of the four 5-spectral value Boolean functions into 1 or −1 comprises:

recording a value of the 5-spectral value Boolean function as 1 in the truth table, if the value of the 5-spectral value Boolean function is 0; and recording a value of the 5-spectral value Boolean function as −1 in the truth table, if the value of the 5-spectral value Boolean function is 1.

6. The method according to claim 5, after the step d of allocating the orthogonal sequence sets to cells, and causing that sequences within each of the cells are orthogonal with one another, and sequences in each of the cells and sequences in neighboring one of the cells are orthogonal with another, further comprising:

minimizing a correlation value mutually spaced ones of the cells, so as to reduce interference of the CDMA system.

7. A code word generating device, applied to a CDMA wireless communication system, and comprising:

a processor and a memory storing instructions executable by the processor, wherein the processor is configured to execute the instructions to generate orthogonal sequence sets;

a storage circuit, electrically connected to the processor, and configured to store the orthogonal sequence sets;

a reading circuit, electrically connected to the storage circuit, and configured to read the orthogonal sequence sets subjected to a control signal; and a transceiver, electrically connected to the reading circuit, and configured to receive and transmit user information coded by using the orthogonal sequence sets;

wherein the processor is configured to execute the instructions to generate orthogonal sequence sets comprises:

select natural numbers in and k, in and k satisfying $m=2k+4$;

construct a 5-spectral value vector Boolean function;

construct 24 orthogonal sequence sets by using the 5-spectral value vector Boolean function; and allocate the orthogonal sequence sets to cells according to a preset rule, and cause that sequences in each of the cells are orthogonal with one another, and sequences in each of the cells and sequences in neighboring one of the cells are orthogonal with one another.

8. The code word generating device according to claim 7, wherein walsh spectral values of the 5-spectral value vector Boolean function are $\{0, 2^{m/2}, -2^{m/2}, 2^{(m/2)+1}, -2^{(m/2)+1}\}$, and a length of a 5-spectral value sequence corresponding to the 5-spectral value vector Boolean function is $2^l$.

9. The code word generating device according to claim 8, wherein the processor is configured to execute the instructions to construct a 5-spectral value vector Boolean function comprises:

$F_2^k$ is a k-dimensional vector space, $F_2$ is a finite field with a feature of 2, and $(b_1, b_2, \ldots, b_k) \in F_2^k$:

$\gamma$ is set to be a primitive element of $F_{2^k}$, and $\{1, \gamma, \ldots, \gamma^{k-1}\}$ is a group of bases of $F_{2^k}$, isomorphic $\pi: F_{2^k} \mapsto F_2^k$ is defined as that $\pi(b_1 + b_2\gamma + \ldots + b_k\gamma^{k-1}) = (b_1, b_2, \ldots, b_k)$, for $i=0, 1$, $\phi_i: F_2^k \to F_2^k$ is set to be a permutation and is defined as:

$$\phi_i(y) = \begin{cases} 0_k, & y = 0_k \\ \pi(\gamma^{[y]+i}), & y \in F_2^{k*} \end{cases},$$

wherein [y] is a decimal representation of y; $\psi_0$ and $\psi_1$ are set to be two permutations on $F_2^2$, and:

$\psi_1(00)=00$, $\psi_1(01)=10$, $\psi_1(10)=01$, $\psi_1(11)=11$, $\psi_2(00)=00$, $\psi_2(01)=01$, $\psi_2(10)=11$, $\psi_2(11)=10$, $X=(x_1, x_2, \ldots, x_m) \in F_2^m$, $X_0=(x_3, \ldots, x_{k+2}) \in F_2^k$, $X_1=(x_{k+3}, \ldots, x_{m-2}) \in F_2^k$, $X'_0=(x_2, \ldots, x_{k+1}) \in F_2^k$, and $X'_1=(x_{k+2}, \ldots, x_{m-3}) \in F_2^k$ are set; then a method for constructing the 5-spectral value vector Boolean function $F: F_2^k \mapsto F_2^2$ is as follows:

$$F(X) = (f_0(X), f_1(X)), i = 0, 1,$$

$$f_i(X) = \begin{cases} \phi_i(X_0) \cdot X_1 + \psi_i(x_1, x_2) \cdot (x_{m-1}, x_m), & \text{if } (x_1, x_2) \in \{10, 11\}, \ X_1 \in F_2^k \\ \phi_i(X'_0) \cdot X'_1, & \text{if } x_1 = 0, \ X'_1 \in F_2^k \end{cases}.$$

10. The code word generating device according to claim 9, wherein the processor is configured to execute the instructions to construct 24 orthogonal sequence sets by using the 5-spectral value vector Boolean function comprises:

divide a $2^m \times 2^m$ dimensional Hadamard matrix into six orthogonal sequence sets according to a preset rule, wherein any one of two of the six orthogonal sequence sets contains $2^{m-2}$ sequences, and any one of remaining four of the six orthogonal sequence sets contains $2^{m-3}$ sequences;

obtain four 5-spectral value Boolean functions according to the 5-spectral value vector Boolean function;

convert truth tables of the four 5-spectral value Boolean functions into 1 or −1, to form four 5-spectral value sequence sets; and multiply each of the six orthogonal sequence sets by the four 5-spectral value sequence sets individually to obtain the 24 orthogonal sequence sets.

* * * * *